(12) United States Patent
Sanderovich et al.

(10) Patent No.: US 10,098,034 B2
(45) Date of Patent: Oct. 9, 2018

(54) MANAGING MULTI-DIRECTIONAL BACKOFF COUNTERS FOR QUALITY OF SERVICE

(71) Applicant: QUALCOMM Incorporated, San Diego, CA (US)

(72) Inventors: Amichai Sanderovich, Atlit (IL); Mordechay Aharon, Pardes Hana Karcur (IL); Alecsander Petru Eitan, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 15/489,487

(22) Filed: Apr. 17, 2017

(65) Prior Publication Data
US 2017/0303161 A1    Oct. 19, 2017

Related U.S. Application Data

(60) Provisional application No. 62/324,333, filed on Apr. 18, 2016.

(51) Int. Cl.
| | | |
|---|---|---|
| H04W 28/02 | (2009.01) | |
| H04L 12/851 | (2013.01) | |
| H04W 74/08 | (2009.01) | |
| H04B 7/04 | (2017.01) | |
| H04B 7/0413 | (2017.01) | |

(52) U.S. Cl.
CPC ...... *H04W 28/0289* (2013.01); *H04B 7/0413* (2013.01); *H04L 47/24* (2013.01); *H04W 28/0278* (2013.01); *H04W 74/085* (2013.01)

(58) Field of Classification Search
None
See application file for complete search history.

(56) References Cited

U.S. PATENT DOCUMENTS

| | | | | |
|---|---|---|---|---|
| 2008/0101308 A1* | 5/2008 | Gaur | ................. | H04W 74/0816 370/338 |
| 2010/0220679 A1* | 9/2010 | Abraham | .............. | H04W 74/06 370/329 |
| 2018/0160451 A1* | 6/2018 | Butt | .................... | H04W 74/008 |

FOREIGN PATENT DOCUMENTS

| | | |
|---|---|---|
| EP | 1333620 A2 | 8/2003 |
| WO | WO-2011140302 A1 | 11/2011 |

OTHER PUBLICATIONS

International Search Report and Written Opinion—PCT/US2017/028078—ISA/EPO—dated Oct. 16, 2017.
Kang S-S., et al., "Provisioning Service Differentiation in Ad Hoc Networks by Modification of the Backoff Algorithm", Proceedings of the Tenth International Conference on Computer Communications and Networks, Piscataway, NJ, USA, IEEE, Oct. 15, 2001, pp. 577-580, XP010562152, ISBN: 978-0-7803-7128-6.

* cited by examiner

*Primary Examiner* — Hong Cho
(74) *Attorney, Agent, or Firm* — Patterson & Sheridan, L.L.P.

(57) ABSTRACT

Certain aspects of the present disclosure provide methods and apparatus for managing channel access using multiple backoff counters.

11 Claims, 4 Drawing Sheets

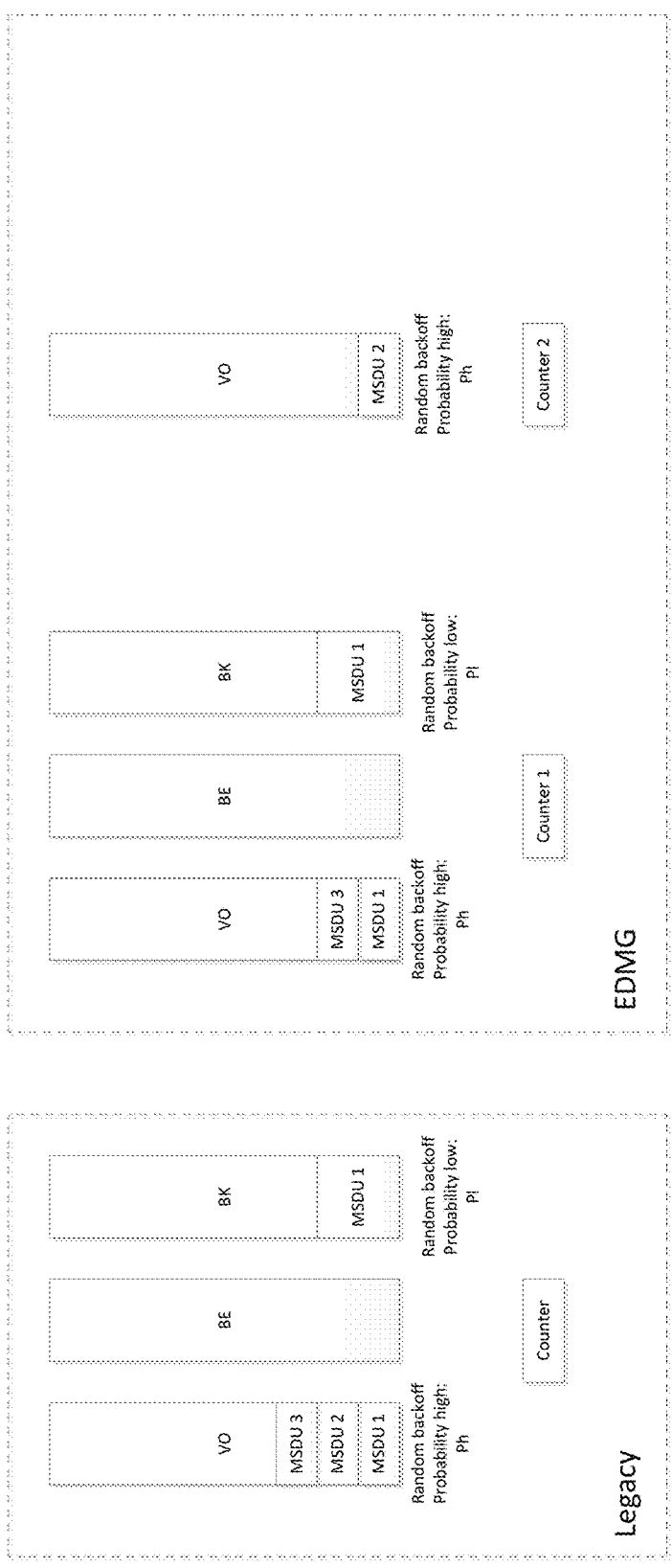
FIG. 3  The ratio between probabilities Ph and Pl sets the AC flow control
FIG. 4  The ratio between probabilities is now changed to 2Ph and Pl.
Possible starvation of BK MSDU due to significantly lower probability, and changed AC flow control

MANAGING MULTI-DIRECTIONAL BACKOFF COUNTERS FOR QUALITY OF SERVICE

CLAIM OF PRIORITY UNDER 35 U.S.C. § 119

The present Application for Patent claims benefit of U.S. Provisional Patent Application Ser. No. 62/324,333, filed Apr. 18, 2016, assigned to the assignee hereof and hereby expressly incorporated by reference herein.

FIELD

Certain aspects of the present disclosure generally relate to wireless communications and, more particularly, to managing packet flow control in applications where multiple backoff counters are used (e.g., corresponding to multiple directions).

BACKGROUND

In order to address the issue of increasing bandwidth requirements demanded for wireless communications systems, different schemes are being developed to allow multiple user terminals to communicate with a single access point by sharing the channel resources while achieving high data throughputs. Multiple-input multiple-output (MIMO) technology represents one such approach that has recently emerged as a popular technique for next generation communication systems. MIMO technology has been adopted in several emerging wireless communications standards, such as the Institute of Electrical and Electronics Engineers (IEEE) 802.11 standard. The IEEE 802.11 standard denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

Certain aspects of the present disclosure provide an apparatus for wireless communications. The apparatus generally includes a processing system configured to maintain a number of backoff counters, each backoff counter being used for flow control of one or more packets from a set of one or more queues, each queue being associated an access class (AC), and to adjust a probability of one or more of the ACs to access a wireless medium based on the number of backoff counters and a first interface for outputting the one or more packets for transmission on the wireless medium based on the flow control.

Aspects of the present disclosure also provide various methods, means, and computer program products corresponding to the apparatuses and operations described above.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 3 illustrates an example of flow control using a single backoff counter.

FIG. 4 illustrates an example of flow control using multiple backoff counters, in which certain aspects of the present disclosure may be applied.

DETAILED DESCRIPTION

Figure 1:
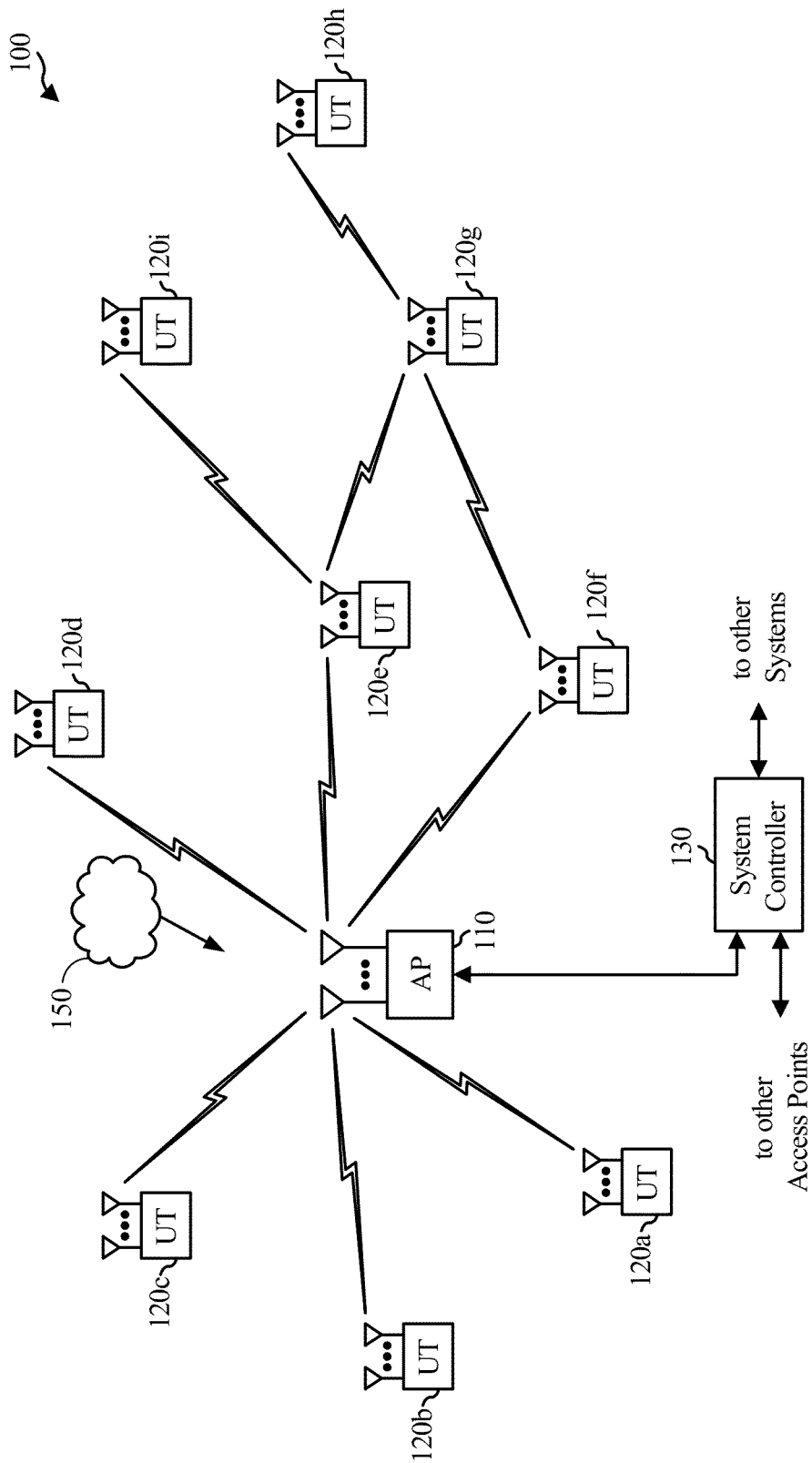
FIG. 1 is a diagram of an example wireless communications network, in accordance with certain aspects of the present disclosure.

Aspects of the present disclosure provide techniques for managing flow control in systems utilizing multiple backoff counters. As used herein, the term flow control generally refers to managing the rate of data transmission between two wireless nodes to prevent one sender (e.g., a fast sender or sender with more data) from preventing another sender (e.g., a slower sender with less data) from accessing a medium. Flow control can also be used to manage the rate of different data transmissions from within the same wireless node (e.g., to prioritize certain types of transmissions from certain applications and/or help ensure certain quality of service parameters are met).

In some cases, backoff counters may be used as a flow control mechanism. For example, if a medium is busy, transmission for a certain type of data (e.g., of a certain type/priority or from a certain application) may be deferred until the end of a current transmission window and delayed by an additional backoff delay. The backoff delay is implemented by choosing a value to initiate a backoff counter.

In some cases, multiple backoff counters may be used for flow control. For example, multiple backoff counters may be used in systems with channel access mechanisms that provide some notion of directionality (e.g., with different backoff counters associated with different directions and/or different antennas) or otherwise address spatial separation when transmitting on the same wireless medium.

Aspects of the present disclosure provide techniques for managing multiple backoff counters used for channel access for directional transmissions, for example, where the different backoff counters may correspond to spatial separation in the physical channels. The use of different backoff counters for directional transmissions may make sense, for example, because while a medium may be busy preventing transmissions in one direction, the medium may be clear in another direction.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an access point (AP) 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
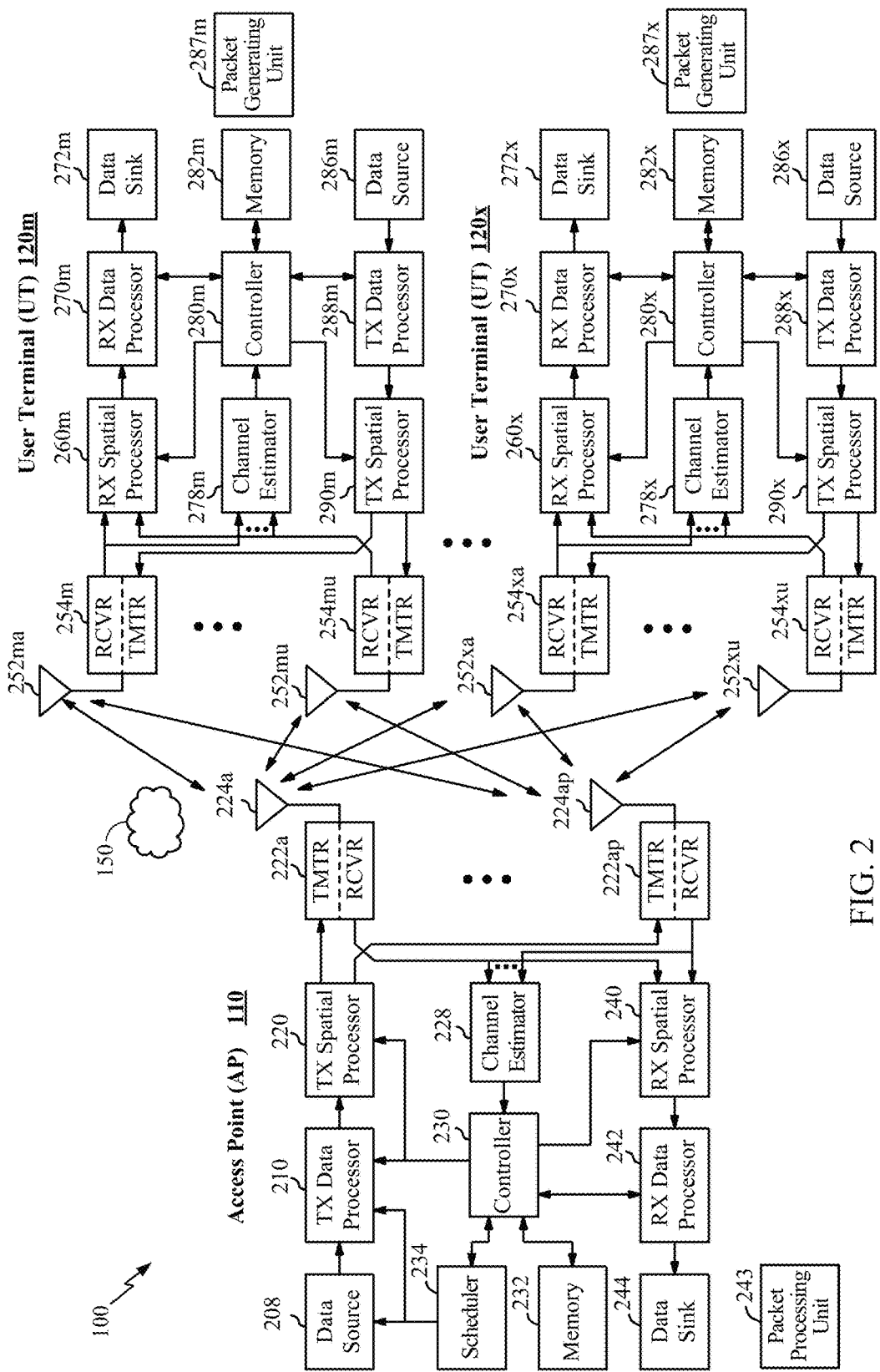
FIG. 2 is a block diagram of an example access point and example user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, Nup user terminals are selected for simultaneous transmission on the uplink, Ndn user terminals are selected for simultaneous transmission on the downlink, Nup may or may not be equal to Ndn, and Nup and Ndn may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

Nup user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all Nup user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Ndn user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Ndn downlink data symbol streams for the Ndn user terminals. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

As illustrated, in FIGS. 1 and 2, one or more user terminals 120 may send one or more High Efficiency WLAN (HEW) packets 150, with a preamble format as described herein, to the access point 110 as part of a UL MU-MIMO transmission, for example. Each HEW packet 150 may be transmitted on a set of one or more spatial streams (e.g., up to 4). For certain aspects, the preamble portion of the HEW packet 150 may include tone-interleaved LTFs, subband-based LTFs, or hybrid LTFs.

The HEW packet 150 may be generated by a packet generating unit 287 at the user terminal 120. The packet generating unit 287 may be implemented in the processing system of the user terminal 120, such as in the TX data processor 288, the controller 280, and/or the data source 286.

After UL transmission, the HEW packet 150 may be processed (e.g., decoded and interpreted) by a packet processing unit 243 at the access point 110. The packet processing unit 243 may be implemented in the process system of the access point 110, such as in the RX spatial processor 240, the RX data processor 242, or the controller 230. The packet processing unit 243 may process received packets differently, based on the packet type (e.g., with which amendment to the IEEE 802.11 standard the received packet complies). For example, the packet processing unit 243 may process a HEW packet 150 based on the IEEE 802.11 HEW standard, but may interpret a legacy packet (e.g., a packet complying with IEEE 802.11a/b/g) in a different manner, according to the standards amendment associated therewith.

Example Management of Multiple Backoff Counters

Aspects of the present disclosure provide techniques to help manage multiple backoff counters in systems where each backoff counter may be used for flow control of data transmissions from different access class (AC) queues. As will be described in greater detail below, the techniques described herein provide a mechanism to effectively change the probabilities of the different AC queues to reach a desired flow control result (e.g., without preventing transmission or "starving" certain types of data).

Certain standards, such as the IEEE 802.11ay standard currently in the development phase, extend wireless communications according to existing standards (e.g., the 802.11ad standard) into the 60 GHz band. Examples of features to be included in such standards is Channel-Bonding (CB) and directional transmissions accomplished using multiple antennas (e.g., an array of antennas). Such transmissions may be referred to as enhanced directional multi gigabit (EDMG) transmissions.

One challenge presented by such features is how to extend channel access mechanisms. Conventional channel access mechanisms are typically limited to accommodating a single transmission at a time and may not have the notion of directionality. As a result, even if a channel is "clear" in a particular direction, if it is busy in another direction, access to the channel may not be allowed. Thus, possible bandwidth gains due to directional transmissions may not be fully realized.

In some cases, multiple backoff counters are used for channel access in EDMG, where the different counters may correspond to spatial separation in the physical channel. As noted above, backoff counters are typically decremented when a clear channel assessment (CCA) indicates a clear channel. Assigning random backoff counters helps reduce the likelihood of collision between different entities competing for access to the medium.

The backoff counter is selected randomly so a backoff period falls within a contention window (CW). Once the backoff counter has expired, the medium may be checked again to see of the deferred transmissions may now be performed. Once a transmission is successful, as determined by receipt of an acknowledgement, the contention window (CW) is reset to a minimum value (CWmin).

The CW size is initially assigned CWmin, and increases when a transmission fails (e.g., the transmitted data frame is not acknowledged by a receiving device sending an ACK frame). After unsuccessful transmission attempts, another backoff is performed using a new (increased) CW value. Typically, increases to the CW value are capped with a maximum value (CWmax). This approach is designed to reduce the collision probability in cases where there are multiple stations attempting to access the channel. After each successful transmission, the CW value is reset to CWmin.

Quality of service (QoS) may be implemented by utilizing several access categories (ACs) which may help effectively establish different back-off generation procedures per transmission queue, where each AC uses a different queue. FIG. 3 illustrates an example use of three such queues, for voice (VO), best effort (BE), and background (BK) traffic.

This use of ACs provides channel access with different probabilities for different types of traffic, corresponding to different access categories (ACs). In general, each AC can have a separate set of parameters to control channel access, such as AIFS, CWmin, and CW. This approach of utilizing different ACs is commonly referred as an enhanced distributed coordination function (EDCF).

The values of AIFS[AC], CWmin[AC], and CWmax[AC], which are referred to as the EDCF parameters, are announced by the AP via beacon frames. The AP can adapt these parameters dynamically depending on network conditions. Basically, the smaller AIFS[AC] and CWmin[AC], the shorter the channel access delay for the corresponding priority, and hence the more capacity share for a given traffic condition (albeit with an increased probability of collisions).

As shown in FIG. 3, each AC may have its own transmission queue. Therefore, for four ACs, with four transmission queues, each queue behaves as a single enhanced DCF contending entity. In other words, each AC queue has its own AIFS and maintains its own Backoff Counter BC. If more than one AC completes backoff at a same time, the highest priority frame among the colliding frames is chosen and transmitted, while others perform a backoff with increased CW values.

These EDCF parameters can be adjusted, as described herein, to effectively adjust the probability of each AC accessing the medium. For example, AIFS and/or CWmin for a particular AC may be reduced to increase probability that AC accesses the medium.

For each queue, different priorities assigned to each AC effectively help establish a different probability of gaining access to a wireless medium. For example, if packets of different ACs are ready for transmission when a backoff timer expires, the AC with the higher priority may be granted access. Referring again to FIG. 3, in the illustrated example, since VO traffic has higher priority than BK traffic, MSDU1 from the VO queue would be sent before MSDU1 from the BK queue.

Thus, this difference results in different probabilities for the ACs in such a way that higher priority packets get higher probability to hold the medium, but still do not starve the lower priority packets, since the probability (of the lower priority packets) is not zero.

When implementing several counters, however, with different AC queues per counter (sharing one transmitter), the resulting probabilities of the AC are changed (relative to when a single counter is used). This change in probabilities may cause starvation of the lower priority packets when many high priority packets are stacked in several directions. This change in relative probabilities may be described with reference to FIGS. 3 and 4.

FIG. 3 illustrates a "legacy" approach utilizing a single backoff counter for a set of queues. As described above, in the illustrated example, a separate queue is provided for each of three different ACs: VO, BE, and BK. Typically, the priorities in descending order are VO, BE, then BK.

As shown in FIG. 3, the probability of accessing the medium for VO traffic (Ph) may be relatively high, while the probability of accessing the medium for BK traffic (Pl) may be relatively low-but still sufficient to avoid starvation of BK traffic. In this manner, the ratio between probabilities Ph and Pl sets the AC-based flow control.

FIG. 4 illustrates an example "EDMG" approach utilizing multiple backoff counters, for example, with each backoff counter used for a different set of one or more AC queues. Each backoff counter, for example, may correspond to a different direction or antenna-which may help provide directionality to the channel access mechanism (e.g., to take advantage of the availably of a channel in one direction while the channel is unavailable in another direction). In the example illustrated in FIG. 4, the second backoff counter is for a second queue for VO traffic.

Assuming the same probability per queue as in FIG. 3, the ratio between probabilities is now changed to 2×Ph and Pl. This change in relative probabilities (with the higher priority traffic now twice as likely to access the medium) now makes it possible to experience starvation of the BK traffic (MSDU) packets due to significantly lower probability, and the changed AC flow control.

Aspects of the present disclosure, however, provide a channel access mechanism that may help address the issue discussed above and may help avoid starvation. For example, starvation may be avoided by changing the probabilities of the different AC queues in an effort to achieve the same flow control AC probabilities when multiple BO counters are used (as when a single counter is used).

For the example shown in FIGS. 3 and 4, this change in probabilities may be accomplished by dividing each probability by (2−Pl). In other words, in FIG. 4 a new probability for Ph (Ph') may be Ph/(2−Pl). This adjustment in probabilities may help offset the (otherwise unfair) increase in the already higher priority to access the medium by VO traffic.

Various other types of adjustments may also be possible to account for multiple timers and achieve a desired (relative) probability of transmitting from any given AC queue without starving other AC queues. Further, while the examples described above assume two backoff counters, the techniques described herein may be applied to adjust probabilities of the ACs to achieve a desired (e.g., a same relative probability) between different ACs, regardless of the number of backoff counters (e.g., a third or more).

Figure 5:
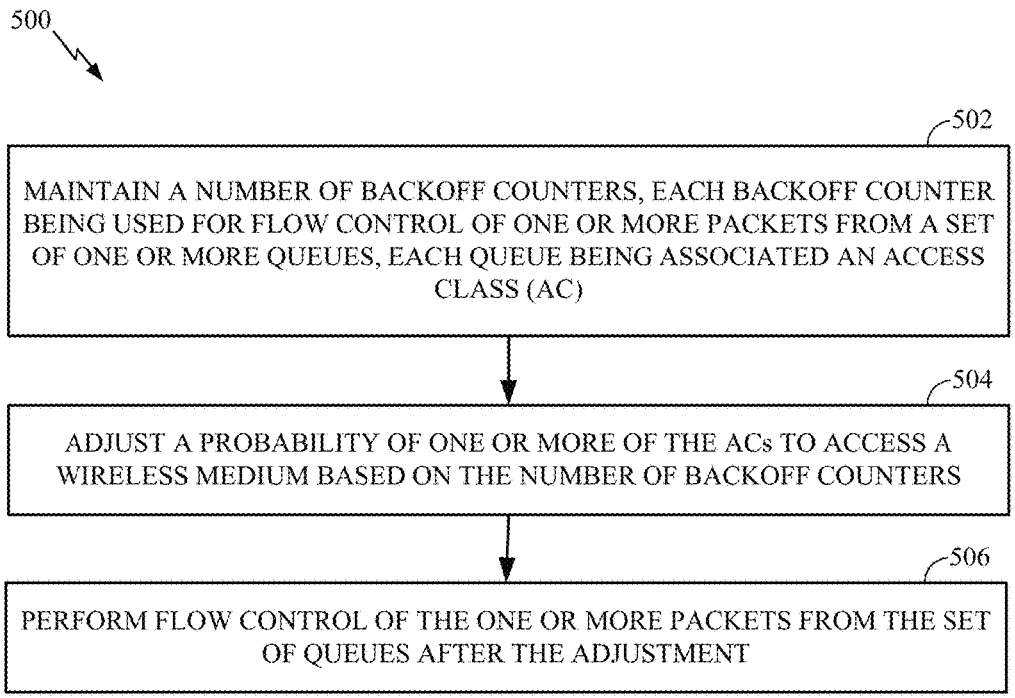
FIG. 5 is a flow diagram of example operations for managing flow control with multiple backoff counters, in accordance with certain aspects of the present disclosure.

FIG. 5 illustrates example operations 500 for managing (multi-directional) channel access, in accordance with aspects of the present disclosure. The operations 500 may be performed, for example, by an access point (AP) or non-AP wireless station to adjust probabilities of medium access by different ACs and avoid starvation in the manner described above.

Operations 500 begin, at 502, by maintaining a number of backoff counters. As noted above, each backoff counter may be used for flow control of packets from a set of one or more transmissions queues, with each transmission queue associated an access class (AC). At 504, the probability of one or more of the ACs to access a wireless medium based on the number of backoff counters is adjusted. At 506, flow control of the one or more packets from the set of queues is performed after the adjustment.

Packets may then be output (from the various queues) for transmission according to the transmit flow control. For example, as each backoff counter expires, packets available for transmission may be sent, with the priorities associated with each AC used to determine which to transmit if multiple packets (with different ACs from different queues) are ready for transmission at the same time.

Figure 5A:
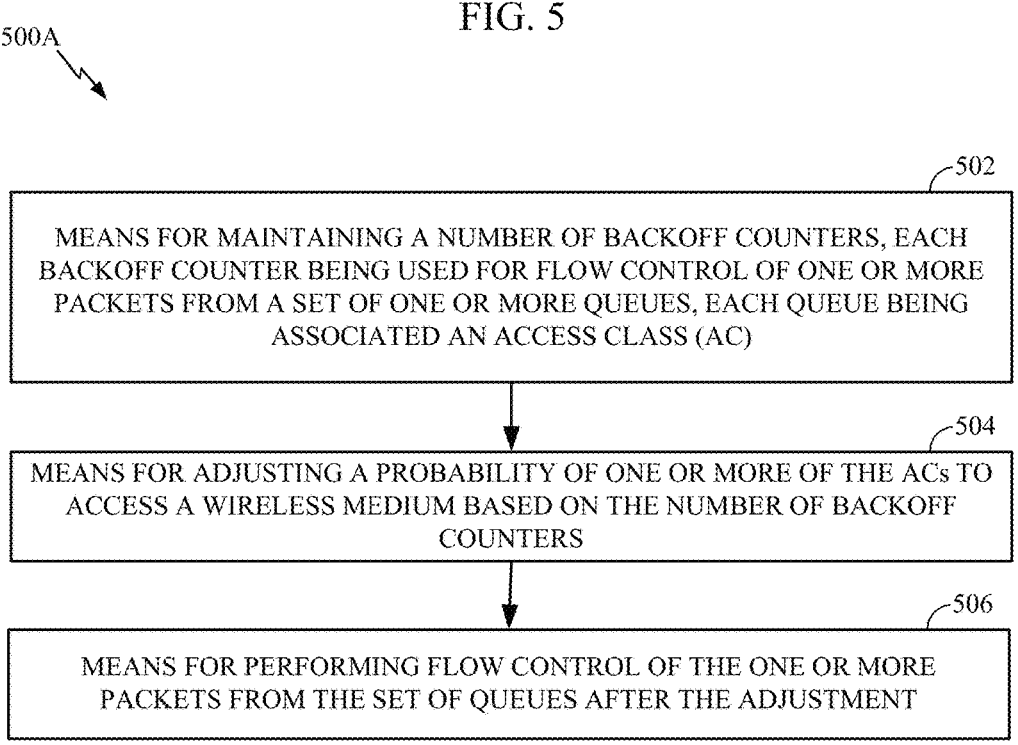
FIG. 5A illustrates example means capable of performing the operations shown in FIG. 5.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500 illustrated in FIG. 5 correspond to means 500A illustrated in FIG. 5A.

For example, means for transmitting (or means for outputting for transmission) may comprise a transmitter (e.g., the transmitter unit 222) and/or an antenna(s) 224 of the access point 110 or the transmitter unit 254 and/or antenna(s) 252 of the user terminal 120 illustrated in FIG. 2. Means for receiving (or means for obtaining) may comprise a receiver (e.g., the receiver unit 222) and/or an antenna(s) 224 of the access point 110 or the receiver unit 254 and/or antenna(s) 254 of the user terminal 120 illustrated in FIG. 2. Means for processing, means for maintaining, means for adjusting, and means for performing may comprise a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the user terminal 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, a phrase referring to "at least one of" a list of items refers to any combination of those items, including single members. As an example, "at least one of: a, b, or c" is intended to cover a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
   a processing system configured to maintain a number of one or more backoff counters, each backoff counter being used for flow control of one or more packets from a set of one or more queues, each queue being associated with an access class (AC), to adjust a probability of one or more of the ACs to access a wireless medium based on the number of backoff counters, and to perform flow control of the one or more packets from the set of queues after the adjustment; and
   a first interface for outputting the one or more packets for transmission on the wireless medium.

2. The apparatus of claim 1, wherein:
   the processing system is configured to adjust the probability of one or more of the ACs to achieve a same relative probability between different ACs.

3. The apparatus of claim 1, wherein:
   the one or more queues comprise at least first and second queues for at least first and second ACs and at least a third queue for the second AC; and
   the one or more backoff counters comprise a first backoff counter associated with the first and second queues and a second backoff counter associated with the third queue.

4. The apparatus of claim 3, wherein:
   a probability of the first AC accessing the wireless medium when using a single backoff counter is a first probability;
   a probability of the second AC accessing the wireless medium when using the single backoff counter is a second probability, lower than the first probability; and
   the processing system is configured to adjust the probability of the first AC, when using at least two backoff counters, as a function of the second probability.

5. The apparatus of claim 1, wherein each of the backoff counters is associated with a different transmission direction.

6. A method for wireless communications, comprising:
   maintaining a number of one or more backoff counters, each backoff counter being used for flow control of one or more packets from a set of one or more queues, each queue being associated with an access class (AC);
   adjusting a probability of one or more of the ACs to access a wireless medium based on the number of backoff counters, and to perform flow control of the one or more packets from the set of queues after the adjustment; and
   outputting the one or more packets for transmission on the wireless medium.

7. The method of claim 6, wherein the adjusting comprises:
   adjusting the probability of one or more of the ACs to achieve a same relative probability between different ACs.

8. The method of claim 6, wherein:
   the one or more queues comprise at least first and second queues for at least first and second ACs and at least a third queue for the second AC; and
   the one or more backoff counters comprise a first backoff counter associated with the first and second queues and a second backoff counter associated with the third queue.

9. The method of claim 8, wherein:
- a probability of the first AC accessing the wireless medium when using a single backoff counter is a first probability;
- a probability of the second AC accessing the wireless medium when using the single backoff counter is a second probability, lower than the first probability; and
- the adjusting comprises adjusting the probability of the first AC, when using at least two backoff counters, as a function of the second probability.

10. The method of claim 6, wherein each of the backoff counters is associated with a different transmission direction.

11. A wireless station, comprising:
- a processing system configured to maintain a number of one or more backoff counters, each backoff counter being used for flow control of one or more packets from a set of one or more queues, each queue being associated with an access class (AC), to adjust a probability of one or more of the ACs to access a wireless medium based on the number of backoff counters, and to perform flow control of the one or more packets from the set of queues after the adjustment; and
- a transmitter configured to transmit the one or more packets on the wireless medium.

* * * * *